United States Patent
Mitchell et al.

(10) Patent No.: US 6,859,561 B2
(45) Date of Patent: Feb. 22, 2005

(54) FASTER LOSSLESS ROTATION OF JPEG IMAGES

(75) Inventors: Joan L. Mitchell, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/856,780

(22) Filed: Jun. 1, 2004

(65) Prior Publication Data
US 2004/0218820 A1 Nov. 4, 2004

Related U.S. Application Data

(62) Division of application No. 09/896,117, filed on Jul. 2, 2001.

(51) Int. Cl.[7] .............................. G06K 9/36; G06K 9/68; G06K 9/32
(52) U.S. Cl. ...................... 382/245; 382/222; 382/296
(58) Field of Search .............................. 382/222, 232, 382/235, 250, 243–246, 276, 289, 295–297, 305; 358/261.1, 427; 341/59, 65, 67; 375/240.23

(56) References Cited

U.S. PATENT DOCUMENTS

| 5,581,635 | A | * | 12/1996 | Zhu et al. ...................... 382/245 |
| 5,867,598 | A | * | 2/1999 | de Queiroz .................. 382/235 |
| 5,933,536 | A | * | 8/1999 | Fukuzawa .................... 382/246 |
| 6,181,825 | B1 | * | 1/2001 | Ragland et al. ............. 382/239 |
| 6,219,457 | B1 | * | 4/2001 | Potu ........................... 382/246 |
| 6,373,412 | B1 | * | 4/2002 | Mitchell et al. ............. 341/65 |
| 6,442,302 | B2 | * | 8/2002 | Klassen ..................... 382/296 |
| 6,466,699 | B1 | * | 10/2002 | Schwartz et al. ........... 382/244 |
| 6,490,376 | B1 | * | 12/2002 | Au et al. .................... 382/290 |

* cited by examiner

Primary Examiner—Andrew W. Johns
Assistant Examiner—Amir Alavi
(74) Attorney, Agent, or Firm—Whitham, Curtis & Christofferson, P.C.; Daniel McConnell

(57) ABSTRACT

Image rotations of 90°, 180° and 270° and horizontal and vertical mirroring image transformations are performed losslessly and with greatly enhanced speed by processing orthogonal transform coefficients in a zig-zag order with direct storage of S (size) values, reassociated R (run of zero valued coefficients) from an adjacent coded orthogonal transform value and a non-zero valued transformation coefficient in reverse zig-zag order. Cache misses are avoided by processing values which are not widely separated in the coded data and other features of the technique and memory accesses are reduced to accelerate processing while extremely little computation is required. These effects are substantially augmented when intermediate codes having certain attributes including coding of zero valued coefficients and flagging certain code features are employed.

11 Claims, 13 Drawing Sheets

FASTER LOSSLESS ROTATION OF JPEG IMAGES

This application is a division of U.S. patent application Ser. No. 09/896,117, filed Jul. 2, 2001.

CROSS-REFERENCE TO RELATED APPLICATIONS

This application is related to U.S. patent application Ser. No. 09/736,444, and Ser No. 09/736,445, both filed Dec. 15, 2000, entitled JPEG Packed Block Structure and Fast JPEG Huffman Coding and Decoding, respectively, and JPEG Packed Block Data Structure for Enhanced Image Processing, filed concurrently herewith, all of which are assigned to the assignee of the present application and hereby fully incorporated by reference.

BACKGROUND OF THE INVENTION

1. Field of the Invention

The present invention generally relates to image data compression and image data processing and, more particularly, to compression of image data in accordance with JPEG, MPEG or other image data standards in connection with reconstruction or other processing of information such as for merge, shift, rotation and the like.

2. Description of the Prior Art

Pictorial and graphics images contain extremely large amounts of information and, if digitized to allow transmission or processing by digital data processors, often requires many millions of bytes to represent respective pixels of the image or graphics with good fidelity. The purpose of image data compression is to represent images with less data in order to save storage costs or transmission time and costs. The most effective compression is achieved by approximating the original image, rather than reproducing it exactly. The JPEG standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard which additionally exploits redundancy between frames for additional compression to meet motion picture and/or television frame rate demands. The JPEG standard has been developed as a flexible system for potentially providing the highest possible image fidelity for a given amount of data while allowing the amount of data representing the image to be reduced by a substantially arbitrary factor. The JPEG standard also allows substantial exploitation of relative sensitivities and insensitivities of human visual perception and it is not unusual for the JPEG standard to allow image data compression by a factor of twenty or more without significant perceptible image degradation.

At the same time, virtually no constraints are placed on processor resources or data processing methodologies so that improvements therein that result in reduced processing time will allow increased throughput and additional processing to be achieved in environments such as high speed printers where the printer will eject blank pages if the next complete page is not ready. Nevertheless, substantial data processing is required for encoding and decoding, particularly due to the need for statistical analyses of converted image values (e.g. discrete cosine transform (DCT) coefficients) in order to assure substantial data compression in accordance with the concept of entropy coding.

The concept of entropy coding generally parallels the concept of entropy in the more familiar context of thermodynamics where entropy quantifies the amount of "disorder" in a physical system. In the field of information theory, entropy is a measure of the predictability of the content of any given quantum of information (e.g. symbol) in the environment of a collection of data of arbitrary size and independent of the meaning of any given quantum of information or symbol.

This concept provides an achievable lower bound for the amount of compression that can be achieved for a given alphabet of symbols and, more fundamentally, leads to an approach to compression on the premise that relatively more predictable data or symbols contain less information than less predictable data or symbols and the converse that relatively less predictable data or symbols contain more information than more predictable data or symbols. Thus, assuming a suitable code for the purpose, optimally efficient compression can be achieved by allocating fewer bits to more predictable symbols or values (that are more common in the body of data and include less information) while reserving longer codes for relatively rare symbols or values.

By the same token, however, the JPEG standard and other image data compression standards have substantially no implications in regard to efficiency of data processing for encoding, decoding or other desired image manipulations beyond those expected from alteration of the volume of data to be processed, transmitted or stored. On the contrary, the very flexibility of coding provided by the JPEG standard requires substantial processing to determine details of the manner in which data is to be decoded, particularly in regard to portions of the coded data which represent variable length codes necessary to efficient data compression in accordance with the principles of entropy coding.

It has been found that some processing is, in fact, complicated by some intermediate data formats which are compatible with entropy encoding into the JPEG standard but not others which are similarly compatible. These standards specify the data streams but not the intermediate formats.

It should also be appreciated that image data compression standards such as the JPEG standard are principally directed toward facilitating exploitation of the trade-off between image fidelity and data transmission and processing time or required storage capacity. However, at the current time, some applications such as high performance printers and image browsers place high demands on both image fidelity and rapid data conversion. For example, high resolution color printers are foreseeable having such high printing speed that processing power at or exceeding the limits of current practicality is required. Such applications may also require additional processing such as image rotation or size change prior to image decoding for which, as a practical matter, no time is available.

Further, it should be appreciated that some loss of fidelity is unavoidable due to the quantization of image data for digital processing. Therefore, coding and decoding is, to some degree, lossy. This lossiness is acceptable for a single coding and decoding process since the nature of quantization can be freely chosen. However, multiple coding and decoding processes which may be necessitated by a need to perform certain image manipulations, such as rotation, on decoded data (that must again be encoded and decoded for efficient processing and storage and acceptable data processing time to reconstruct the image) generally cause substantial and readily perceptible image degradation as well as requiring substantial processing time that may not be reasonably or economically available.

Rotation is often necessary since digitization of an image (including initial image capture), as a practical matter, must develop a serial data stream which necessarily corresponds to image orientation (e.g. as initially captured). The orientation of the image, as digitized, may not correspond to the desired orientation or dimensional format (e.g. so-called landscape or portrait formats in which the longer dimensions are horizontally and vertically oriented, respectively) for image reproduction by, for example, display or printing and where the image dimensions must be accommodated by the reproduction medium.

Rotation processing, in particular, has generally required operations to be performed on decoded image data which are necessarily lossy for that reason. While theoretically possible, lossless rotation of coded image data performed in the transform domain, has required extremely complex techniques with prohibitive levels of data processing.

In this regard, it should be appreciated that the JPEG standard provides an increased likelihood of grouping of zero and near-zero valued orthogonal transform coefficients (e.g. DCT coefficients) by ordering them by approximate (increasing) spatial frequency in the horizontal and vertical directions within a block of data in order to exploit relative insensitivities of human perception. As applied to a matrix of transform coefficient values, this order is referred to as a zig-zag order. It may be significant to note, however, that while a zig-zag order may provide a significant benefit in this regard, the lossless rotation technique that has been proposed included a proposed raster scan order for processing and a zig-zag order of processing may have been considered as being too computationally complex to be practical.

At the same time, the current state of the art has made available the possibility of extremely high performance printers and image browsers in which very rapid response is necessary, even when image rotation must be included. Similarly, the current state of the art has provided digital cameras where the capability for image rotation would be very desirable but where only relatively limited amounts of hardware for processing and storage can be made available.

SUMMARY OF THE INVENTION

It is therefore an object of the present invention to provide a practical technique for lossless image rotation by processing in the transform domain which can be accomplished with processing comparable to that required for image decoding.

It is another object of the invention to provide lossless image rotation processing in connection with coded data formats which enhance decoding such that, under most circumstances, rotation processing as well as decoding and other processing can be accomplished during a time required for decoding alone in the absence of the invention.

It is a further object of the present invention to provide the foregoing objects enhanced by a digital data format which is JPEG compatible and which allows reduced processing time for decoding, facilitates execution of DCT domain image processing algorithms, and which may be decoded in a simplified and consistent manner without imposing significant limitation on image fidelity or significant decrease in compression efficiency.

In order to accomplish these and other objects of the invention, a method of lossless image rotation is provided by operation on compressed data including steps of associating an R value of a run length of zero-values preceding a non-zero orthogonal transformation coefficient in a zig-zag order with an S value corresponding to an adjacent, following, non-zero orthogonal transformation coefficient in a reverse zig-zag order in a matrix of orthogonal transformation coefficient, and outputting the R value and the S value with the orthogonal transformation coefficient.

In accordance with another aspect of the invention, a method of performing lossless rotations of image data is provided including the steps of rearranging or maintaining orthogonal transform coefficient zig-zag order, depending on rotation angle, altering signs of the orthogonal transform coefficients by an exclusive OR operation inverting binary values of the orthogonal transform coefficients, and storing an R value with an adjacent S value and orthogonal transform coefficient value in reverse zig-zag order if the zig-zag order is rearranged.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
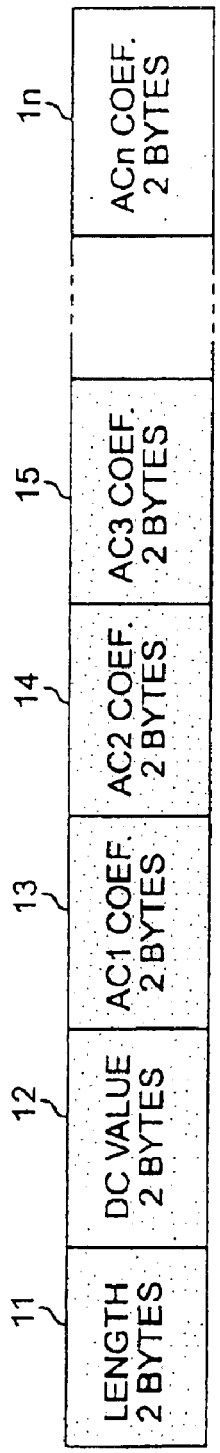
FIG. 1 is a schematic depiction of a data format for digital image data compliant with the JPEG standard.

Referring now to the drawings, and more particularly to FIG. 1, there is shown a schematic depiction of a JPEG compatible intermediate data format for a block of quantized transform coefficients for use in the IBM JPEG Express code which was developed to simplify processing in high performance requirement products such as high-speed printers and internet browsers. As is well-understood in the art, an image is digitized by first dividing the entire image into areas which can be thereafter processed as blocks. The blocks are preferably subdivided into a matrix of areas of preferably 8×8 areas or cells.

The image values (e.g. color, intensity, etc. in accordance with any image value or color coordinate system) are then quantized and a data transformation is performed such as a discrete cosine transformation (DCT) which provides values which are more easily compressed. For example, a DCT provides a number of DCT coefficients which are equal in number to the number of samples which make up the image block but many of the coefficients will be zero or near zero.

After quantization, the near-zero coefficients will be zero. If these quantized coefficients are reordered into a so-called zig-zag order (of approximately increasing or decreasing spatial frequency in both the horizontal and vertical directions) such zero quantized values will often be grouped together in accordance with relative sensitivity of human perception. These groups or runs of zero or near zero values which can be expressed in very few bits or bytes which allows substantial data compression while minimizing the perceptibility of loss of image fidelity.

The data structure of FIG. 1 stores the DCT quantized coefficients in zig-zag scan order as two bytes per coefficient. Each coefficient up to the end of block signal is assigned two bytes. The leading two bytes 11 is a length field to define the number of bytes in the DCT block, from which the EOB can be calculated and need not be separately provided. The DC coefficient 12 and AC coefficients 13, 14, . . . 1n are represented by two bytes each but not all AC coefficients need be included if the value of higher spatial frequency AC coefficients are zero or sufficiently near-zero. The variable number of bytes in a block can thus yield substantial compression by truncation of zero quantized DCT coefficients of the higher spatial frequencies. Alternatively, the length field 11 can be split into a byte length and another byte for the EOB position.

This format, when used for the JPEG compatible code in demanding applications has proved to be inefficient since the necessity of loading zero valued coefficients and test for non-zero values is computationally too expensive for the speeds demanded of these applications. By having to load and store many zero-valued coefficients, cache misses were induced, leading to an increase in the number of memory accesses and increased processing burden. The magnitude of this burden and avoidable memory hardware and operational requirements may be appreciated from the fact that many blocks have five or fewer non-zero coefficients.

Figure 2:
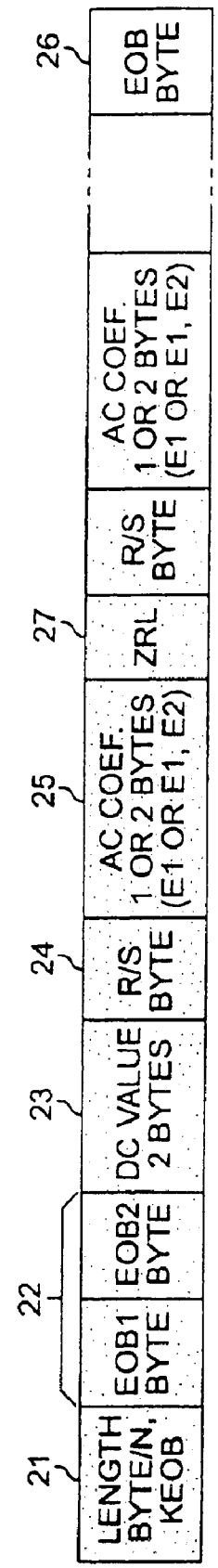
FIG. 2 is a schematic depiction of a packed block data format as disclosed in the above-incorporated U.S. patent application Ser. No. 09/736,445.

Referring now to FIG. 2, a JPEG compatible packed block format as disclosed in the above-incorporated application Ser. No. 09736,444, (JPEG Packed Block Structure) is shown. Each DCT block starts with a length byte 21 followed by two bytes 22 to save the location of the EOB for sequential coding and the current EOB for progressive coding. The quantized DC coefficient 23 is stored in the next two bytes/sixteen bits. This may be represented as either the actual DC coefficient value or the difference in DC coefficient from the previous block (e.g. as a prediction). However, the former is generally preferred when further DCT domain processing is anticipated to render the blocks (and their order) self-contained and independent of each other. On the other hand, where the purpose of the format is to save the information while statistics are being accumulated (e.g. for generating custom Huffman tables, saving the DC coefficient value as the prediction (not shown in FIG. 1) converted into an S byte followed by the one or two bytes of extra bits will minimize later processing. It is possible to use both formats simultaneously.

Each non-zero AC coefficient is stored in two or more bytes. The first byte 24 is the R/S byte used for Huffman encoding, (i.e. the high order nibble R=four bits) equals the run of zero-valued AC coefficients in zig-zag order up to fifteen and the low order nibble S=four bits) is the number of extra bits necessary to uniquely code the non-zero magnitude. A preferred form of this packed format stores the extra bits in the next one or two bytes (e.g. E1 or E1 and E2) 25, depending on whether or not the second byte is needed (i.e. S>8). That is, E2 is an optional second byte which is only needed if S>8. The EOB byte is used if EOB1<64.

Since the ZRLs and E2 are data dependent, data is access one byte at a time. An alternative implementation always follows the R/S byte with the actual AC coefficient value in two bytes. The final byte is the symbol 0x00 which indicates that an EOB is to be coded. ZRL is a byte 27 of the form 0xF0 used when the run of zero coefficients is greater than 15.

While both of the data formats of FIGS. 1 and 2 were developed to provide certain enhancements in the context of certain processing functions for image data and are effective to do so, neither is optimal for some fundamental image data processing requirements, such as decoding, or some relatively ubiquitous image manipulations, such as rotation by multiples of 90°. Specifically, the data format of FIG. 1 allows compression only by truncation of the terminal/high spatial frequency zero valued quantized coefficients and is therefore inefficient in processor and memory utilization as alluded to above. The packed data format of FIG. 2 requires multiple tests per block, possibly as many as sixty-three, to be carried out to determine the number of non-zero AC coefficients to be encoded or otherwise processed. Further, responsive to such tests, the image data must be synchronized to the number of bytes actually used for each ZRL or DCT coefficient.

Figure 3:
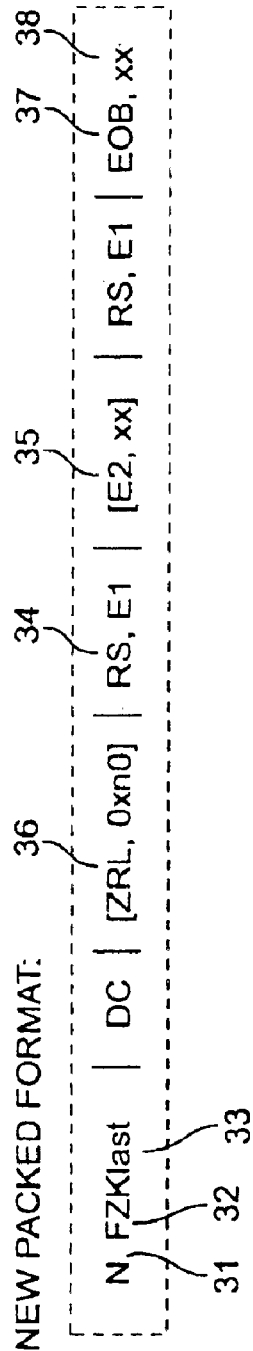
FIG. 3 is a schematic depiction of an improved packed block data format in accordance with the present invention.

Referring now to FIG. 3, the improved JPEG packed-block structure in accordance with the invention is shown. In essence, this format allows determination and flagging on a per block basis whether any extra bytes were used for the coefficients (E2s) or whether any ZRLs occurred. If not, the AC coefficients stay synchronized as half words and the tests and related code to determine if the next byte is a ZRL or if the size is greater than eight (requiring an extra byte to be appended) are unnecessary. Further, by rounding all block lengths up to even or four byte boundaries, the AC coefficients can be accessed as halfwords or words and not necessarily only by bytes as was preferred to facilitate synchronization although requiring greater numbers of memory accesses. This reduces by a factor of two or four the number of reads and writes needed to access the coefficient information in packed format while simplifying the code.

The data format illustrated in FIG. 3 requires that the number of bytes in the block (i.e. the number of starts and stops at word boundaries) be a multiple of four. The EOB1 variable of FIG. 2 is replaced by a new variable FZKlast composed of a flag bit, F (31), indicating that there is at least one S (34) value greater than eight in the block (indicating presence of and need to decode an E2, 35), a flag bit, Z (32), indicating that there is at least one ZRL (36) in the block and the remaining six bits (Klast) 33 give the index of the last non-zero quantized coefficient. The relationship between EOB1 and Klast is EOB1=Klast+1. EOB1 was defined as the first zero coefficient in the final run of all zero coefficients. Klast is defined as the last non-zero coefficient. In addition, the EOB byte 37 is always appended and padded with padding bytes 38 to a word boundary. Optionally, these padding bytes can be of the form 0x01, 0x02, 0x03 so the final byte in the block shows exactly how many padding bytes were used.

Figure 4:
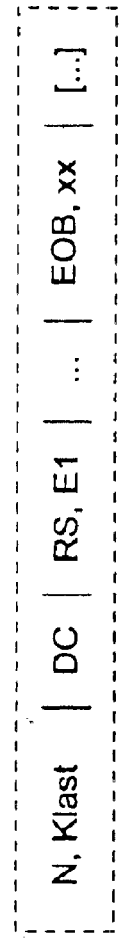
FIG. 4 is a schematic depiction of a simplified form of an improved packed block data format in accordance with the invention.

For those blocks in which there are no E2s or ZRLs, the data format of FIG. 3 simplifies to the data format shown in FIG. 4. Note that in this case, FZKlast will be 00Klast and each AC coefficient will be represented by an R/S byte where S is less than or equal to eight and the R value represents a zero value run length of less than sixteen AC coefficients. The byte 0x01 after the EOB byte can contain an arbitrary value. For reasonable Q values, this is the most common case and the non-zero bytes are pairs of bytes on two-byte boundaries. It can be understood that the data format of FIG. 4 will be prevalent since the concept of entropy coding provides that only the most rare DCT values will require coding using more than one byte.

In addition, for the case where there are ZRLs (R>15), the ZRLs can be made to fit in two bytes, preserving synchronism, instead of one, two or three bytes. The format of FIG. 2 preferably used the actual symbols 0xF0 and each symbol used indicated a Huffman code. An optional addition to the format of FIGS. 3 and 4 is to always use two bytes for the ZRL code; using the first byte for the symbol 0xF0 and the second byte for the run. Alternatively, the second byte could be the number of ZRLs in the block, as is preferred for the preferred form of rotation processing which will be described below with reference to FIGS. 6–15:

| FIG. 2 | Length (bytes) | FIG. 3 | Length (bytes) |
|---|---|---|---|
| 0xF0 | 1 | 0xF010 | 2 |
| 0xF0F0 | 2 | 0xF020 | 2 |
| 0xF0F0F0 | 3 | 0xF030 | 2 |

The preferred embodiment for the packed format in accordance with the invention is to make the coefficients fit into two or four bytes rather than two or three bytes to guarantee maintaining two byte synchronism. Some ways to pack two or four bytes are:

| FIG. 2 | Length | FIG. 3 | Length |
|---|---|---|---|
| R/S, E1 | 2 | R/S, E1 | 2 |
| R/S, E1, E2 | 3 | R/S, E1, XX, E2 | 4 |
|  |  | R/S, E1, E2, XX | 4 |
|  |  | R/S, XX, E1, E2 | 4 |

Figure 5:
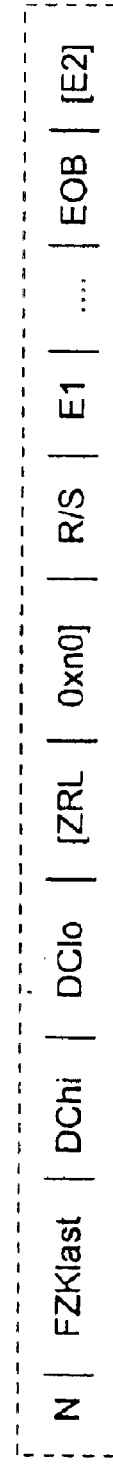
FIG. 5 is a schematic depiction of an alternative form of the improved packed block data format in accordance with the invention.

An alternative way to pack the bytes and keep the coefficients on halfword boundaries is to take the E2 byte and store it in reverse order at the end of the packed block buffer after the EOB and any padding bytes. In this case, the size of the block itself does not increase and the additional E2 bytes will equal the number of times S>8 occurred as shown in FIG. 5.

It should be appreciated that the use of the above format of FIGS. 3 and 4 in accordance with the invention may involve one test per block to determine the presence of either ZRLs or E2s in a direct conversion operation performed on each data block. While this represents a major reduction in the processing burden in contrast with other JPEG compatible data formats, even this much reduced amount of testing may be further reduced by a very large factor. Specifically, the quantization tables and the custom Huffman tables may be examined once per image (and in a timeslot outside the block data processing time since these tables are separately generated and transmitted) to determine if the decoder would ever need to look for an extra coefficient byte, thus making possible simpler code and the use of smaller tables (since fewer values would require decoding by reference thereto).

The packed JPEG structure can optionally store the R/S symbol as an S/R symbol with the R and S nibbles interchanged. The R (run) can and does have any value from 0 to 15 while the S may be limited in its range depending on the Q-values used. Also the S symbol rapidly decreases in its likelihood of occurrence as the size increases so caching may be improved with the opposite order. The entropy decoder can simply generate the reversed order if this variation is desired.

Exemplary pseudocode to test for S>8 in the Huffman tables is:

Inside Huffman marker code processing subroutine when pointing to R/S bytes should know the sum of the 16 Li terms which is the number of R/S bytes for that table.

```
For all Huffman tables have a flag,
    char sGT8;           /* byte that flags if S>8      */
    char RS[256];        /* buffer with RS bytes        */
    int num:             /* number of RS bytes          */
    If class=1;          /* if Huffman AC table         */
        sGT8=0;          /* preset to S<9               */
        num = sum;       /* number of RS bytes          */
        do while num>0;  /* loop to look at RS bytes    */
                         /* start with last RSs first   */
            num-=1       /* decrement index             */
            if(RS(num)AND 0x0f)>8
                         /* if S>8                      */
                sGT8=0x80 /* set bit                    */
                break    /* found one                   */
            endif        /* endif S>8                   */
        enddo;           /* end of loop to look at RS   */
    endif                /* endif AC Huffman table      */
```

The remainder of the code can know from this flag that S>8 is impossible and paths can then be followed which never test for such a condition.

In view of the foregoing, it is seen that the intermediate data format in accordance with the invention provides for reduced numbers of memory calls by allowing word or half word accesses and much reduced processing while synchronization is maintained. On average, the memory accesses for any given image will be reduced by a factor of about two, generally allowing time for other processing that may be desired such as image rotations and the like without requiring more processing power than is currently economically feasible. Additionally, the improved packed block structure is compatible with and will provide similar advantages with at least the MPEG-1, MPEG-2, H.261 and H.263 video standard which all use 8×8 blocks of a single component.

As alluded to above, it has been found by the inventors that lossless rotation of an image by multiples of 90° (including horizontal and vertical mirroring, as should be understood to be included in general references to "rotation" hereinafter) is possible by processing in the othogonal transform domain, as discussed in Japanese patent 2-698034, assigned to the assignee of the present invention and hereby fully incorporated by reference. As discussed therein, if the image data is in rasterized form, the raster order is changed by such a rotation in a manner which is familiar to those skilled in the art. In accordance with JPEG and other image data compression standards, an orthogonal transformation (e.g. discrete cosine transformation, DCT) is performed on the digitized image data in blocks, preferably of 8×8 pixel dimensions, to yield sixty-four coefficients which contain most of the data in the original image, although some lossiness is unavoidable.

These resulting coefficients (sometimes referred to hereinafter as "transform coefficients" or "DCT coefficients", although the latter should usually be understood, in the context of this disclosure, as an allusion to the preferred embodiment as well as a collective reference to coefficients resulting from any orthogonal transformation) are serially arranged in JPEG compressed data but are often conceptualized in matrix form of similar 8×8 dimensions.

As alluded to above, a zig-zag order within the matrix of orthogonal/DCT coefficients will approximate order of ascending spatial frequency of the coefficients in both the horizontal and vertical directions. This zig-zag order is familiar to those skilled in the art. It has also been demonstrated, as discussed in the above-incorporated Japanese patent, that the order of the orthogonal transform coefficients remains the same for a rotation of 180° and horizontal and vertical mirroring but with sign changes which are different for each orientation change and that coefficient order is reflected about an upper-left to lower-right diagonal for rotations of 90° and 270° with different, respective patterns of coefficient sign changes. (Identifications of rotations herein are made with reference to a clockwise rotation direction convention as distinct from the counterclockwise direction which is the usual mathematical convention.) The sign changes (indicated by a "1" but preferably implemented with 0xFF code) for 180° rotation and horizontal and vertical mirroring are as follows:

| 180° rotation | Horizontal mirror | Vertical mirror |
|---|---|---|
| 01100011 | 00101001 | 01001010 |
| 11000001 | 01010100 | 10010101 |
| 11111000 | 10101010 | 01010010 |
| 00001111 | 10100101 | 10101010 |
| 11110000 | 01011010 | 10101010 |
| 00011111 | 11010101 | 10110101 |
| 10000011 | 01010110 | 01010110 |
| 11000110 | 10101101 | 10101101 |

Tables for the 90/270 rotations are:

| 90 | 270 |
|---|---|
| 00101001 | 01001010 |
| 01010100 | 10010101 |
| 10101010 | 01010010 |
| 10100101 | 10101010 |
| 01011010 | 10101010 |
| 10101010 | 10110101 |
| 11010101 | 01010110 |
| 01101011 | 10101101 |

Once so demonstrated, this relationship of ordering to rotation can be readily understood when it is appreciated that columns of orthogonal transform coefficients are ordered by increasing vertical spatial frequency and rows of orthogonal transform coefficients are ordered by increasing horizontal spatial frequency and that rotations of 90° and 270° transpose horizontal and vertical directions while 180° rotations and mirroring do not, while the reference edge(s) of the block are interchanged and reflected in the signs of coefficients for spatial frequencies which are not symmetrical across a block. However, even though these relationships appear quite orderly, it must be recalled that compression under the JPEG and other standards relies upon the likelihood of relatively large numbers of the orthogonal transform having zero or near-zero values which may then be coded in fewer bits. In other words, as transmitted in JPEG compatible code, the zero valued coefficients and some near-zero valued and/or extreme high and low spatial frequency coefficients are suppressed.

Thus, the coefficient values in JPEG compliant code are extremely unlikely to be in a well-ordered sequence and the entire sequence of coefficients must be regenerated at a cost of a substantial computational burden in order to perform the required transpositions and sign changes even though the rotation could then be performed losslessly and without the computational burden of an inverse orthogonal transformation and a further (lossy) forward orthogonal transformation. In practice, it was preferred to perform the lossless rotation processing of the above-incorporated Japanese patent in raster scan order rather than other orders in part because of the trade-off between storage and processing time although latency of the data in a block was significant.

More specifically, the lossless rotation processing of the above-incorporated Japanese patent required a large number of tests to be performed for partially decoding the compressed JPEG data signal (e.g. for run lengths codes of zero-valued coefficients, ZRLs) to reconstruct orthogonal transformation coefficients and the processing of large numbers of zero and near-zero valued coefficients, processing in raster scan order and conversions thereof and performing sign changes by testing and negation.

All of these requirements, particularly testing of particular bits of a complex and extended signal comprising variable length codes carry a substantial processing burden and/or substantial hardware requirements for storage. Further, as a matter of processing speed, larger storage requirements and the transposition and/or conversion of coefficient values which may be widely separated in the compressed or expanded (but not decoded by inverse orthogonal transformation) caused numerous cache misses and extra processor cycles for memory accesses, greatly slowing processing. All of these costs of lossless processing are addressed by the invention, a preferred embodiment of which will be discussed in detail below, particularly when implemented in connection with either of the packed data block structures of FIG. 2 or FIGS. 3–5, described above.

It should also be appreciated that the invention is applicable to any data compression standard which uses data blocks of equal horizontal and vertical matrix dimension and can readily accommodate zig-zag scan order which is widely used in JPEG and other compression standards. Specifically, the rotation processing of the invention is applicable to MPEG-1, MPEG-2 H.261 and H.263 standards which also use an 8×8 block for compression of a single image component. In MPEG standards, the motion vectors must also be similarly rotated and the signs reversed in some instances.

The direct application of the invention performs more optimally on complete frames but will also work on individual fields which are displaced in time. However, in the latter case, after independent rotation of fields, the top and bottom lines must be deleted or padded to preserve the correct time sequence. That is, the top line is expected to go with the field which is first in time and the bottom line is expected to go with the field which is last in time; which relationship will be necessarily altered when image orientation is altered by rotation or mirroring.

The concepts and principles of the invention are also applicable to other orthogonal transforms such as wavelets in which the 8×8 block becomes an N×M block and one block may comprise the entire image. That is, the division of the rotation processing into two respective problems of rotating individual blocks and then reordering the blocks is not essential. Similarly, standards such as JPEG 2000 that uses wavelets and where the horizontal and vertical ordering of sub-sampling is specified (and which is not preserved after 90° and 270° rotations) may be accommodated by modified decoders which are aware of the horizontal and vertical order to correctly reconstruct the image, as will be evident to those skilled in the art. Further, the invention is not limited to operation in connection with the packed block data format of FIGS. 2–5 and other data formats may be employed or even be preferable if the quantized coefficients are coded in raster order other than zig-zag order.

Figure 6:
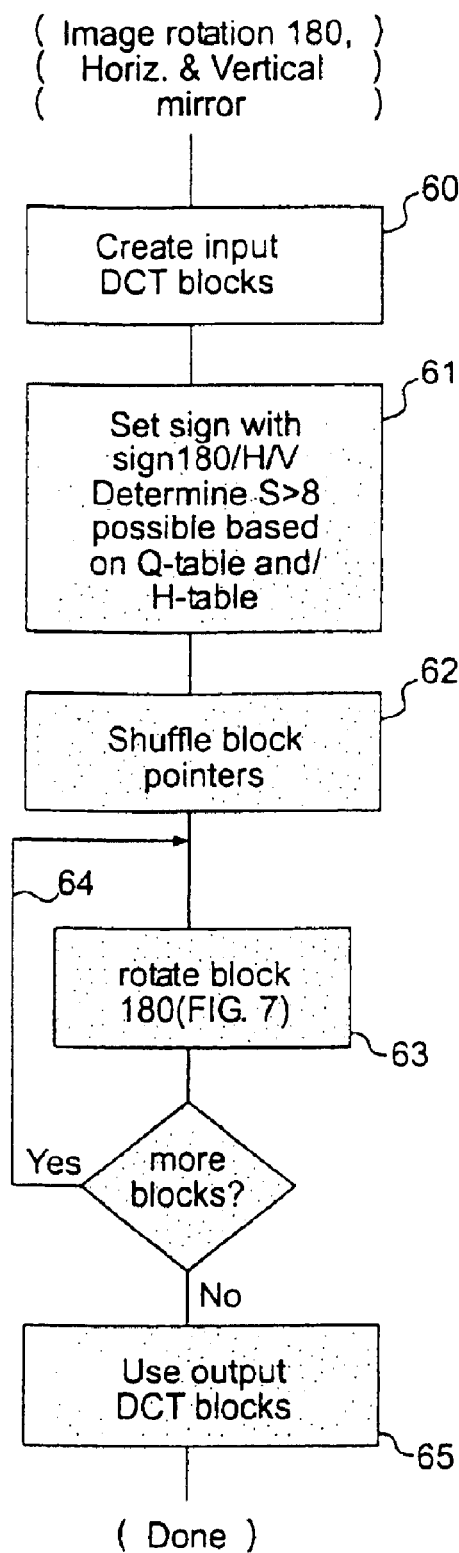
FIGS. 6, 7, 8, 9, 10, 11, 12, 13, 14 and 15 are detailed flow charts illustrating a preferred embodiment of the invention.
Figure 7:
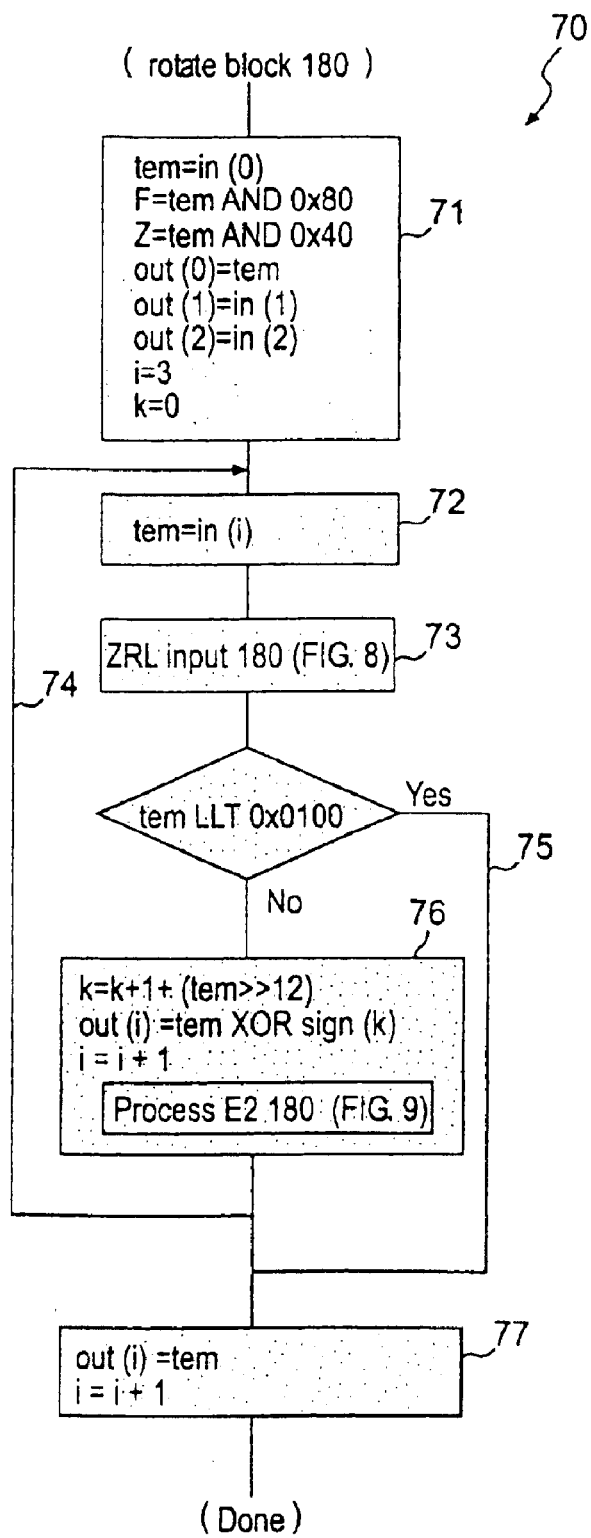
Figure 10:
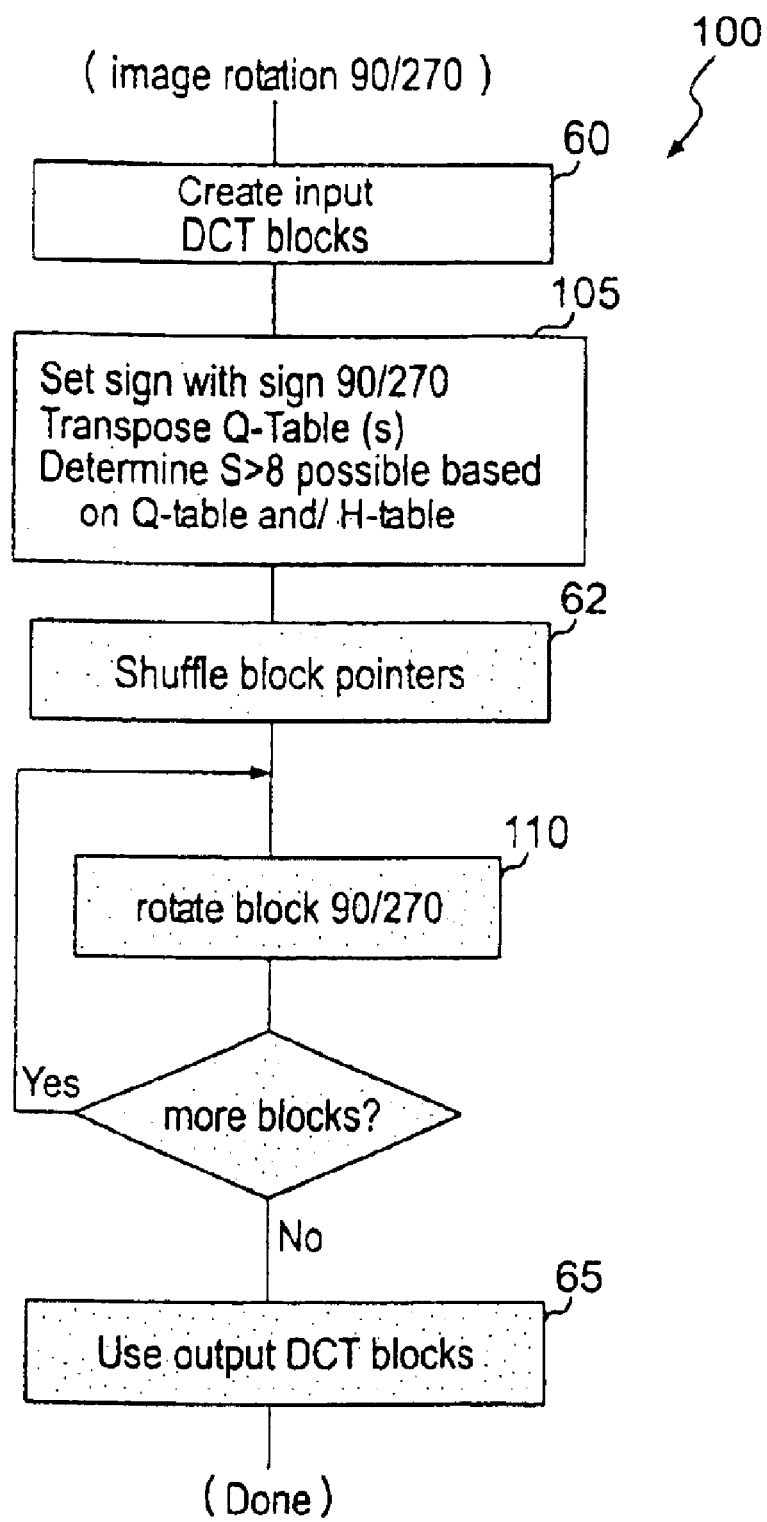
Figure 11A:
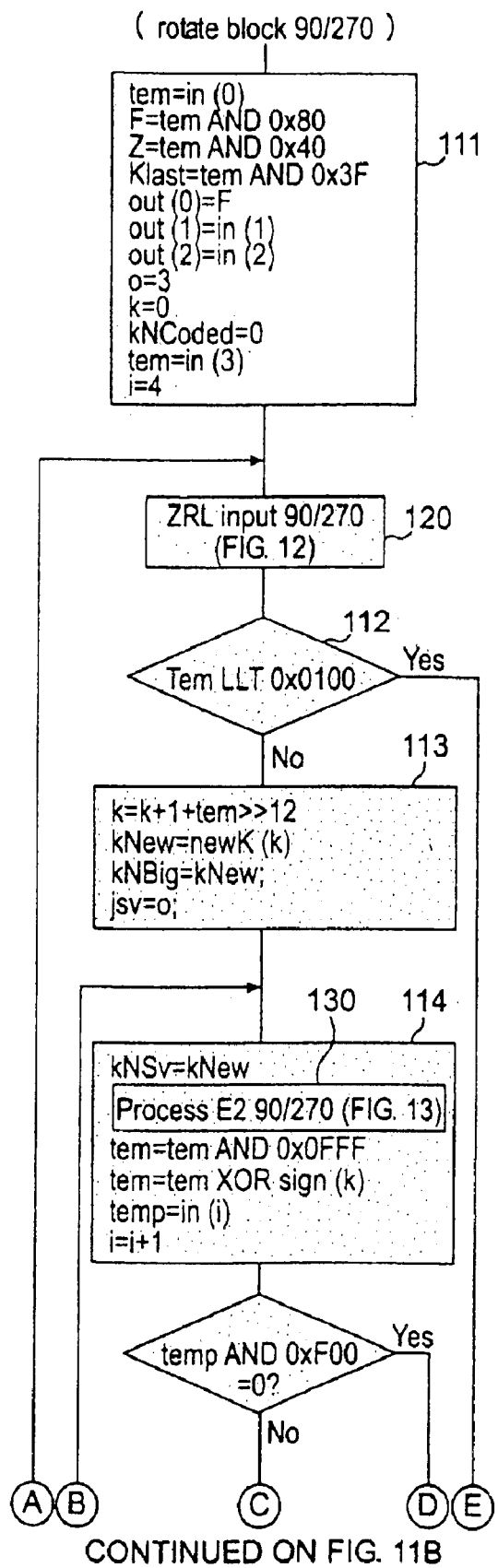
Figure 11B:
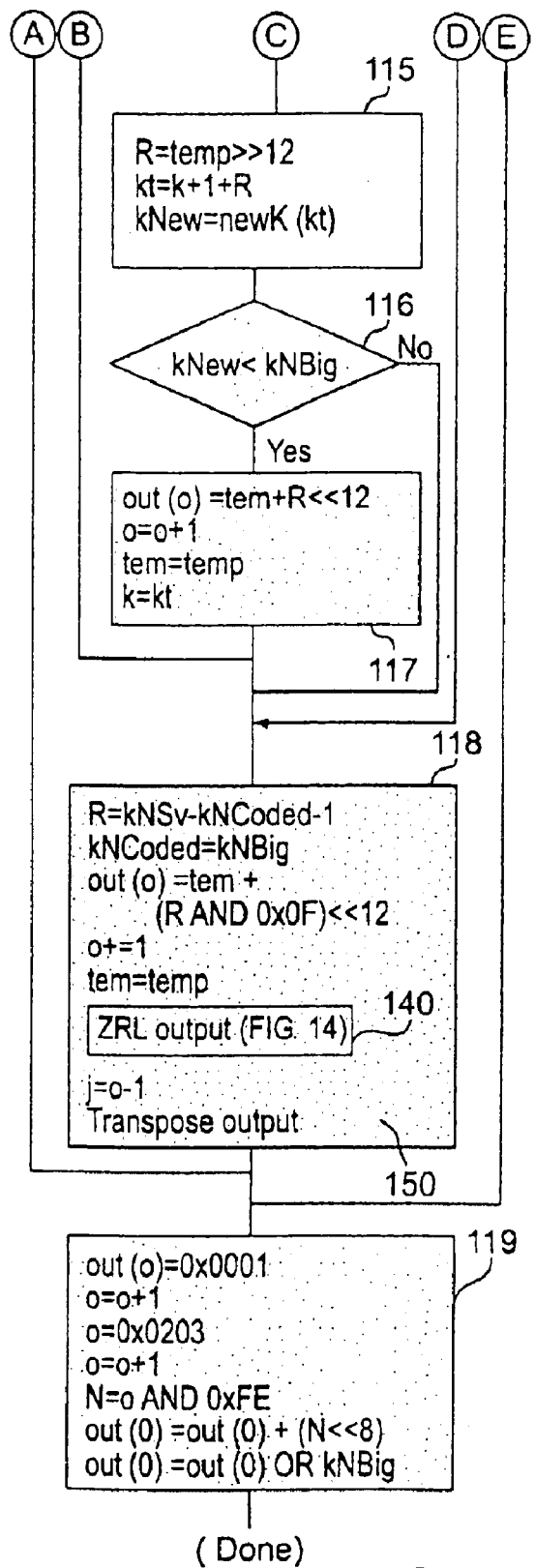

As alluded to above, rotation processing is preferably divided into a rotation of the data representing the image in respective blocks and then re-ordering the blocks to reconstruct the image, although such division is not necessary to the successful practice of the invention. However, such a division conforms to a basic requirement of the JPEG standard and is preferred for that reason as well as providing substantial hardware and processing economies in that context. Further, because of the relationship of pairs of rotations (e.g. 0° and 180° or 90° and 270° ), the block rotation process is preferably divided between the respective pairs of possible rotations. In the following discussion of the preferred embodiment of the invention, FIGS. 6–9 are directed to the 180° rotation (including mirroring) and FIGS. 10–15 are directed to 90° and 270° rotations. FIGS. 6 and 10 are flowcharts of the respective overall processes, FIGS. 7 and 11A and 11B are overall block rotation processes and the remainder of the Figures are details of processes therein.

It should be appreciated that some of these processes are optional and can be omitted. FIGS. 6 and 10 are, of course, not performed in cases or standards where the entire image comprises a single block and the processes of FIGS. 7 and 11A, 11B are sufficient. The optional processes of FIGS. 8, 9, 12 and 13 can be omitted based on whether ZRLs or E2s are present which can be handled with particular efficiency in connection with the packed block structure of FIGS. 3–5 and/or minimal testing of code or tables. FIG. 14 is directed to setting ZRL flags in connection with the packed block structure of FIGS. 3–5 and FIG. 15 is directed to transposing outputs along diagonals of a zig-zag order and suitable alternative processing will be evident to those skilled in the art to accommodate other output code conventions.

In FIGS. 6–15, the following variables are used and defined as follows (assuming the packed block structure of FIGS. 3–5 and that char/short means one or two bytes per element, respectively):

| | |
|---|---|
| short in | packed JPEG "in" pointer to input block |
| short out | packed JPEG "out" pointer to output block |
| char/short sign | sign table for desired rotation |
| int i | index into input buffer |
| int j | index to swap diagonal coefficients |
| int jsv | save start of diagonal coefficients |
| int k | original order zig-zag index |
| int kLast | kLast stored in input header |
| int kNBig | first coefficient on next diagonal |
| int kNCoded | last coefficient coded in new order |
| int kNew | new order zig-zag index |
| int kNLast | new kLast |
| int kNSv | previous coefficients in new order |
| int kt | temporary original order k |
| int N | number of elements in block |
| int o | index into output block |
| int R | isolated run between coefficients |
| int S | isolated size of coefficient |
| int tem | temporary variable |
| int temp | temporary variable |

Referring now to FIG. 6, the overall process begins with creation of the data of respective blocks 60. The image is captured in any known or foreseeable manner and the image values are entropy decoded, transformed by a forward discrete cosine transform (FDCT) or other orthogonal transformation and quantized or other suitable processing performed. The packed data format of FIG. 2, as an intermediate code format accommodates this function particularly well as discussed in detail in the above-incorporated patent application Ser. No. 09/736,445 entitled Fast JPEG Huffman Encoding and Decoding. The signs of the respective coefficients are then set 61 preferably by using a code having the property of inversion by complementing of respective bits (which can be accomplished by an XOR operation of the coefficient with a value in a table preferably provided in read-only memory, as is preferred). Suitable 8×8 tables for 180° rotation and horizontal and vertical reflections/mirroring are provided in the above-incorporated Japanese patent.

Then, also in step 61, it is determined if the block includes a value of S which is greater than 8 by reference to the Q values in the quantization tables and/or the R/S bytes in Huffman table symbols. This information is stored, preferably by encoding flags in accordance with the data format of FIGS. 3–5, for later use. In this connection, it should be appreciated that S values indicate the number of extra bits (e.g. E2) needed to encode a coefficient value and occur very infrequently in most coded images. Further, the Q values in the quantization tables can be arranged such that S>8 does not occur or occurs even less frequently. This trade-off is a matter of variation of coding efficiency which is also usually very small if adverse at all.

The order of the blocks is then shuffled in accordance with the rotation or mirroring operation as indicated at 62. It should be appreciated that steps 60, 61 and 62 are completely independent operations on different portions of the data in preparation for rotation of individual blocks 63, detailed in FIG. 7 and can be [performed in any desired order. The process loops 64 for each block until all blocks have been processed and the results utilized as desired after image reconstruction at 65.

Referring now to FIG. 7, the process 70 of a 180° rotation or horizontal or vertical mirroring of a block will now be discussed. In step 71 variables are initialized for processing each block. In particular, flags for F and Z are set and then the remainder of the block preamble is copied from the input block to the output block, up to and including the DC coefficient which is unaffected by rotation. The variables are then initialized to be set up for iterating through the AC coefficients by setting the index within the block (the first three terms having already been processed) and the zig-zag index (0 since we have just processed the DC coefficient). The flags are kept as 0×80 and 0×40 so they can be simply ORed into the output. In processing the flags, in(0), the first element in the input block, is copied into a local variable which loads it into a register and prevents possibly two extra memory lookups since this value is used three times.

Figure 8:
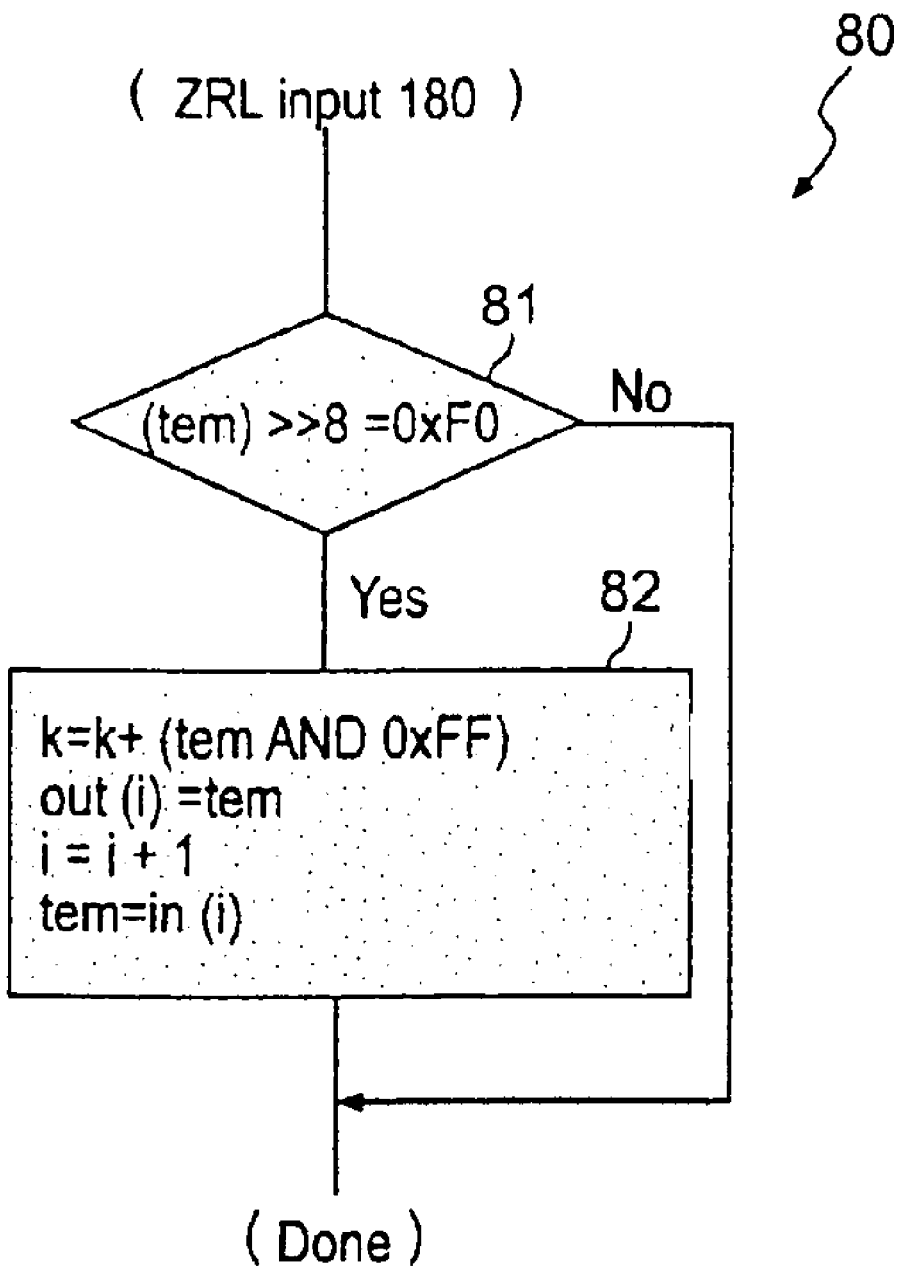

Loop 74 then processes each AC coefficient in turn. The next AC coefficient is loaded at 72 and ZRL input processing which will be discussed below in connection with FIG. 8 is performed if ZRLs are, in fact possible in the block as determined from the Z flag detected in step 71. Step 75 detects if the variable tem is logically less than the EOB code and, if so, the process is complete and exits to 77. If not, k is incremented by one plus the value of tem shifted right by twelve bits (the run plus one), the next R value if non-zero, the sign of the coefficient is changed or maintained, preferably by an XOR operation with a table value and i is incremented. Depending on the state of the flag F, detected at 71 or by testing of the quantization and/or Huffman tables as alluded to above, E2 processing is optionally performed (as will be discussed in connection with FIG. 9) and the process loops to the next non-zero AC coefficient.

It is important to an understanding of the performance enhancement of the invention that zero-valued AC coefficients are processed only from the R value in the signal, as a group with no actual processing of the zero value. The vast majority of blocks will generally have five or less non-zero AC coefficients out of a possible maximum of sixty-three. Thus, even neglecting the benefits of not reconstructing the zero-valued coefficients and using values directly from the JPEG code as well as reducing memory calls, the vast majority of blocks can be processed in accordance with the invention more than an order of magnitude faster than the case where all coefficients, including zero-valued coefficients, are processed. In other words, the reduction in processing time will be, at a minimum, accelerated by a factor comparable to the compression ratio of the JPEG code, itself.

While rare, ZRLs are accommodated by process 80, illustrated in FIG. 8. Step 81 tests for a ZRL in the block by right shifting the current temporary variable by 8 bits and determining if a ZRL code, discussed above, is then presented. This step may be avoided by other expedients such as when k is at least 48 no further ZRLs can be present in the block. If a ZRL is detected it is known that it will be of 16, 32 or 48 bits as is encoded in the signal, as described above. The code is preferably detected and the increment derived by ANDing tem and 0xFF and stored for output. Any further zero valued coefficients beyond 16, 32 or 48 are represented in the next R value in the packed block data. The variable i is then incremented and tem is updated to complete the ZRL processing and load the next AC coefficient.

Figure 9:
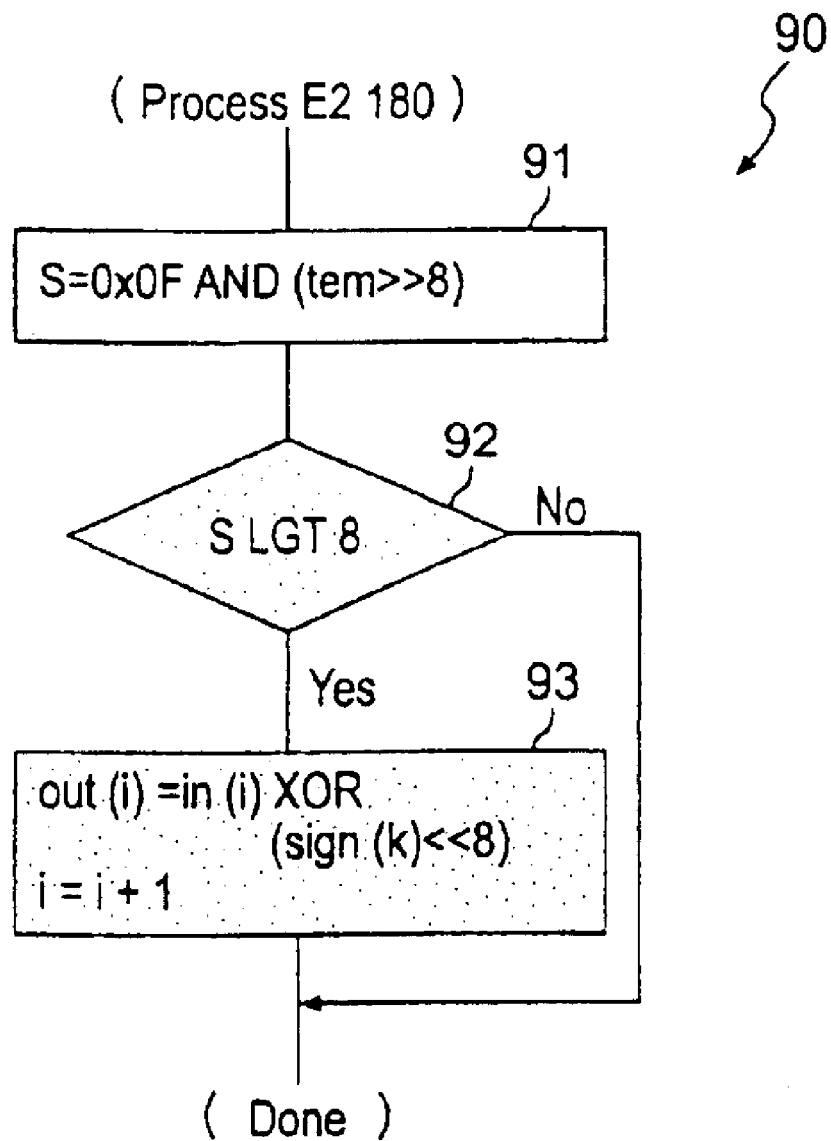

Processing 90 of E2s, as illustrated in FIG. 9 also begins with a test by ANDing an appropriate hexadecimal code with the ten variable right shifted by four bits to present the S value in the code. (The current halfword contains RS in the first byte with R being the first four bits and S being the second four bits. To right-align and extract S, the halfword must be right-shifted by eight to remove E1 and ANDed with 0x0F to remove R.) It is then determined if S>8 and if not, step 93 need not be performed. Other expedients can be used such as flag F indicating that no extra bits are used for the current AC coefficient or an indication that no E2 is used in the image by checking quantization and/or Huffman tables as alluded to above or simply disallowing E2s in the code.

If an E2 is present, however, it is inverted, if necessary (e.g. if E1 is inverted in step 76 of FIG. 7, the same is done to the corresponding E2), preferably by the same XOR operation with a table value and stored for output. Then i is incremented to the next AC coefficient and E2 processing is complete for that AC coefficient.

Referring now to FIG. 10, the overall process 100 for 90° and 270° rotations will now be discussed. Steps 60, 62 and 65 are identical to those similarly numbered and discussed above in connection with FIG. 6 and further discussion is unnecessary. Also, as in the process of FIG. 6, steps 60, 62 and 105 can be performed in any desired order. Step 105 differs from step 61 in that different tables are used for sign changes and an additional process of transposing the quantization tables is required. In the 180° rotation/mirror case, the AC terms conceptually remain in the same places and no change in the quantization tables is required. In the 90°/270° rotation case, the AC coefficients are shuffled. The Q-table must be correspondingly transposed, as well, os that the same quantization terms are used later when the rotated blocks are decompressed. The quantization and/or Huffman tables are preferably examined as before to determine if S>8 is possible.

Step 110 generally corresponds to the performance of step 63 but the process itself differs substantially as will now be discussed in connection with FIGS. 11A and 11B. In general, however, the differences are attributable to the need to remap the locations or order of coefficients across an upper left to lower right diagonal.

It will be helpful to an understanding of this process to note that an early exit and a bypass branch for a substantial number of operations are preferably provided to expedite and shorten processing. Also, two loops are provided for processing all (non-zero) AC coefficients and processing AC coefficients within a single (upper right to lower left) diagonal. This articulation of the process allows limitation of time consuming testing for ZRLs based on the recognition that runs of 16, 32 or 48 zero-valued coefficients cannot occur in the same diagonal, adjacent diagonals or when i is greater than 48 (the last 16 AC coefficient numbers).

Initialization and processing through the DC coefficient (which will not be changed since the average image and transform value for the block will not be changed by any rotation) is first performed in step 111 which largely corresponds to step 71 discussed above. Important differences include the initialization of kLast to the less significant six bits of the header, setting the output index to three (since the first AC coefficient will be placed in the third word location of zig-zag scan order of the output), setting kNCoded=0 so that the DC coefficient will be properly indexed, tem is set to the index of the first AC coefficient and i is set to four to initialize the input index to the second AC coefficient. Optional ZRL processing 120, detailed in FIG. 12, can then be performed if necessary. Then tem is tested and if logically less than the EOB code the process branches to 119 for final output storage and exits. Technically, the EOB is the first (most significant) byte in a halfword. The second byte is padding and might be any value (although in practice, it is not set to zero). To cheaply test whether the first byte is zero, a test is made for tem<0x0100, since this will be true for all halfwords with a first byte of zero, regardless of the content of the padding byte.

At 113, the next diagonal is defined and the index jsv is set to the first AC coefficient on the diagonal. The loop to process AC coefficients in this diagonal starts with step 114 which stores the first coefficient. Optional E2 processing 130 as detailed in FIG. 13 can then be performed. The R is cleared (since it is either the initial R that will not be reflected in the output or will have been developed from a prior diagonal as will become clear from the discussion of FIG. 15, below), leaving S and E1, the sign of the AC coefficient is changed by flipping with an XOR operation, the next coefficient is loaded and the index is incremented.

At 115, the R value of the next non-zero coefficient is isolated by right shifting by 12 bits and k is incremented by the run (R) value plus 1 and the new order index is found, preferably by a look up table access. At 116, the next AC coefficient is tested to determine if it is on the same diagonal and, if not, step 118 is performed to further process and store the output as will be detailed below in connection with FIGS. 14 and 15. If the next AC coefficient is on the same diagonal there is no need to process or even test for ZRLs and the process loops at B to process further AC coefficients after storing the current coefficient with the appropriate r value and incrementing the output index using the next coefficient and the temporary k computed at 115. Step 119 will be appreciated as comprising formatting to develop a signal in accordance with FIGS. 3–5.

Figure 12:
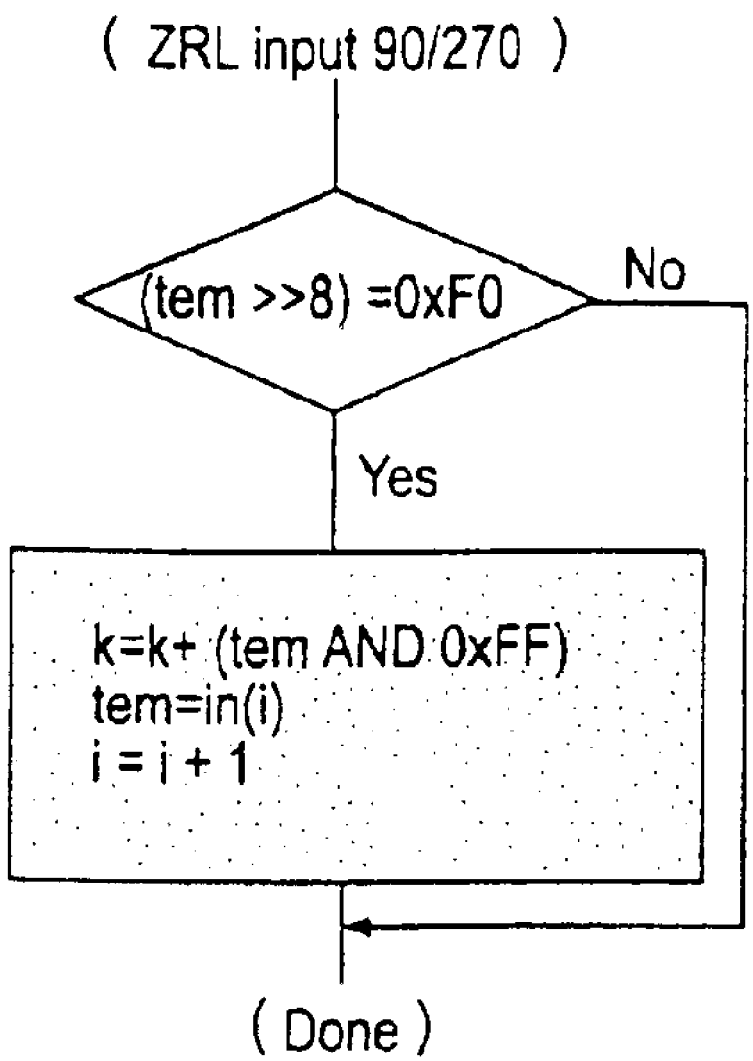
Figure 13:
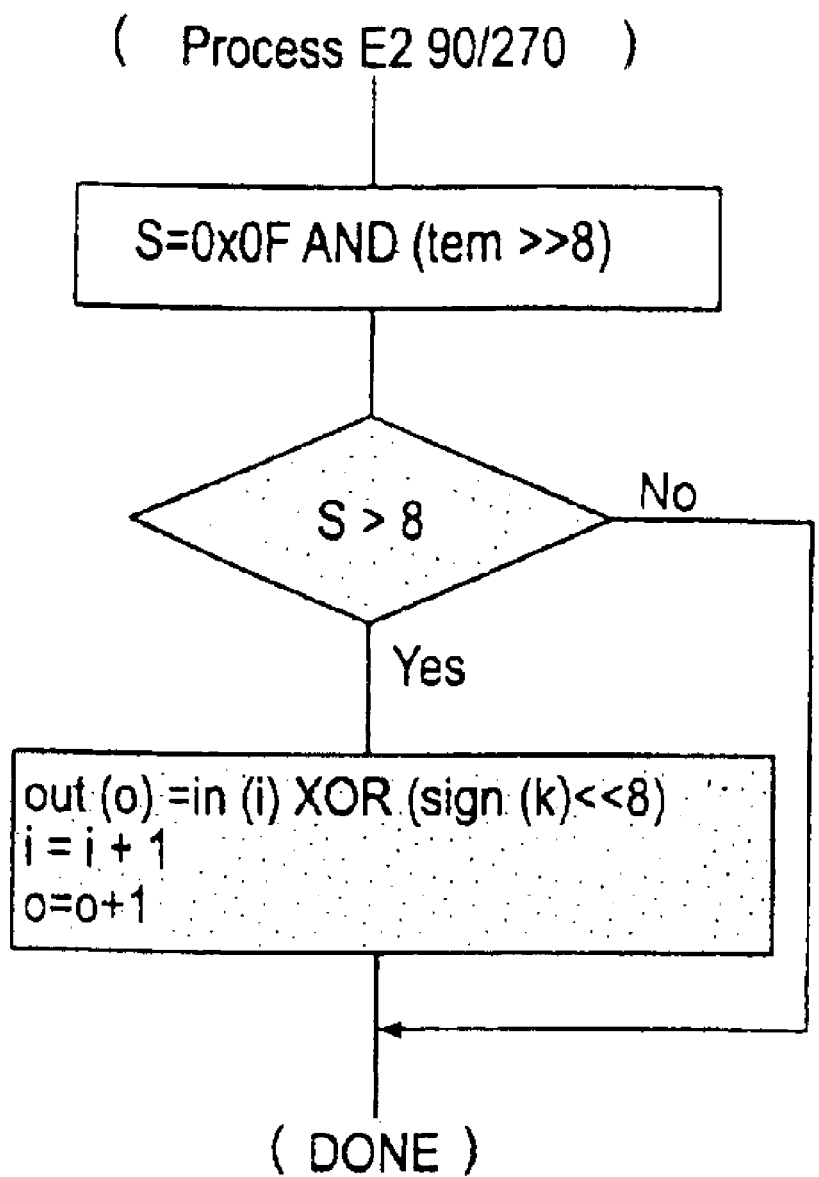
Figure 14:
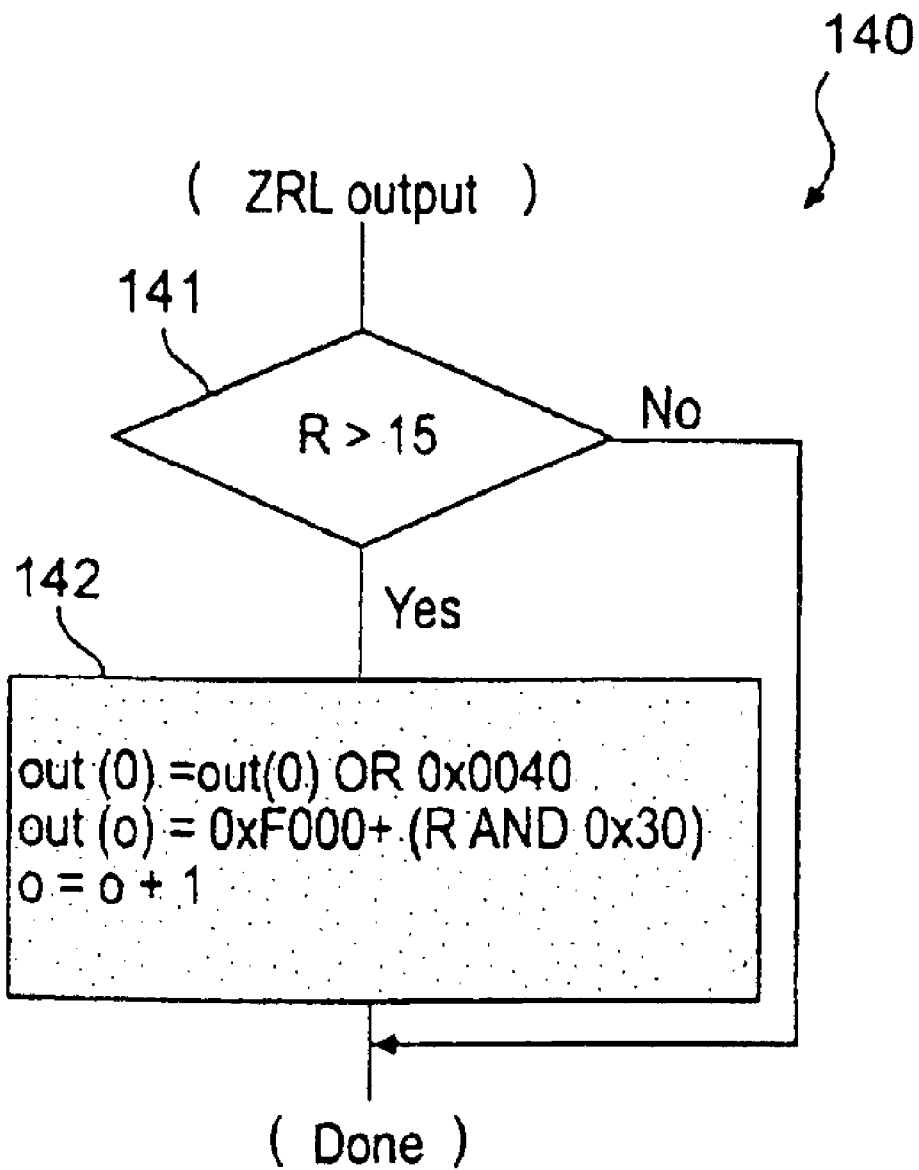

FIGS. 12 and 13 are substantially similar to FIGS. 8 and 9, respectively. The significant difference of FIG. 12 from FIG. 8 is the omission of a storing step. This omission is significant since the 180° does not change the order of the AC coefficients and each ZRL is merely copied. For 90°/270° rotations the coefficients are shuffled and the zero runs may change. Thus the ZRLs are folded into the general algorithm. FIG. 13 includes an additional step of incrementing the output index. For similar reasons, after sign flipping the diagonals must be rebuilt using the output index which is suitably incremented in this operation.

The process for output ZRL processing shown in FIG. 14 is specific to the packed data block format of FIGS. 3–5 and is optional in the sense that it is not performed unless that format is to be developed (in which case, an alternate process accommodating another format might be used) and could be omitted altogether if ZRLs are not permitted and are coded as R values. Step 141 simply performs a test to determine if R>15 and, if not, no ZRL is needed and step 142 is bypassed. If R>15, the z flag is set, the size of the ZRL (16, 32 or 48) is coded and the output index is incremented.

Figure 15:
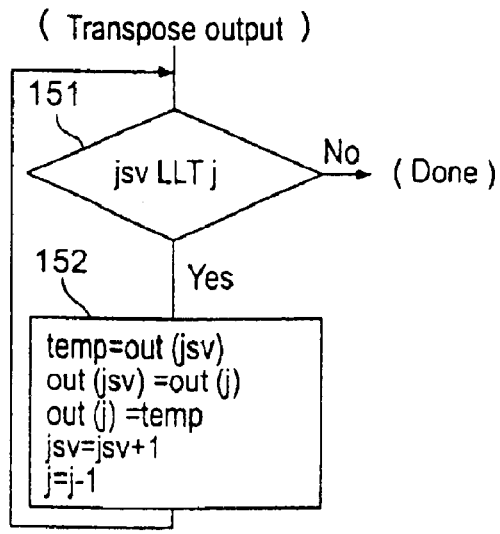
Figure 16:
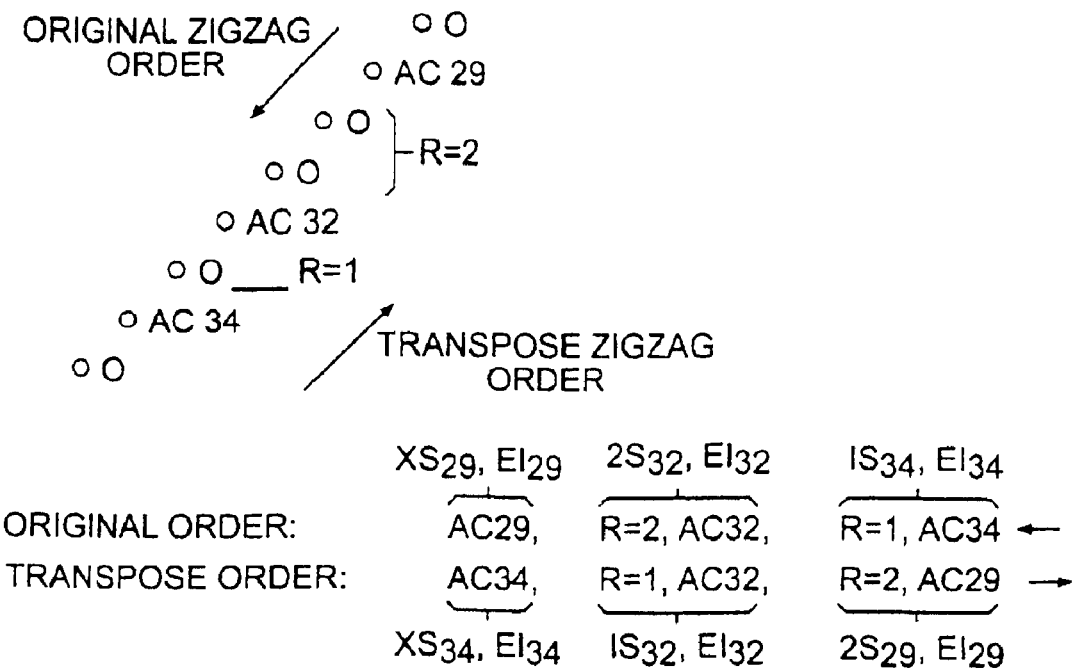
FIG. 16 is a diagram useful in understanding the operation of FIG. 15.

FIG. 15 illustrates processing for transposing the positions of coefficients in the output sequence. FIG. 16 illustrates the effect of this process. In FIG. 16, an exemplary upper right to lower left diagonal is shown. The directions of the original zig-zag order and the new, opposite, zig-zag order (although these directions may be reversed, depending on the particular diagonal). Non-zero AC coefficients are located at indices 29, 32 and 34 along this diagonal and denoted as AC29, AC32 and AC34, respectively. The remainder of the AC coefficients along the diagonal are zero-valued.

As shown in FIG. 15, a loop is used for each transposition. The loop begins with a test to determine if more than one coefficient remains unprocessed. If only the CD coefficient (which remains unchanged) remains, the process is complete and exits. If not, once the variables are set for the current coefficients, the transposition is accomplished by incrementing JSV while decrementing j. The effect of this step 152 is to change the original order of AC29: {X1 (representing an R value continuing from a previous diagonal), S(29), E1(29)}, {R(=2)s(32), E1(32)}, {R((=1)S(34), E1(34)} (with brackets delineating halfwords) to {X2 (R continued from a previous diagonal in the opposite order)S(34), E1(34)}, {R(=1)S(32), E1(32)}, {R(=2)S(29), E1(29)} which restores the format of the original intermediate data format of FIGS. 3–5.

It should be noted in this regard, that the halfword synchronization of the preferred data format automatically restores the order of the R/S byte and the E1 byte while attaching the R(34) nibble to the R(32) nibble, the R(32) nibble to the S(29) nibble and so forth by half words. No additional processing is required for this function in the preferred embodiment of the invention and processing is, accordingly, greatly accelerated.

In view of the foregoing, it is seen that the Rotation technique in accordance with the invention provides a practical technique for lossless rotation in a simplified and consistent manner without imposing any significant limitation on image fidelity or data compression efficiency. This technique, when used in connection with data formats such as those of FIG. 2 or FIGS. 3–5, under most circumstances provides rotation and decoding/reconstruction in the same or less processing time using a processor of comparable power as previously required for decoding/reconstruction alone in the absence of the invention. This meritorious effect is particularly pronounced using the data formats of FIGS. 2–5 and, especially, the data format of FIGS. 3–5.

While the invention has been described in terms of a single preferred embodiment, those skilled in the art will recognize that the invention can be practiced with modification within the spirit and scope of the appended claims.

What is claimed is:

1. A method of performing lossless rotations of image data including the steps of
    rearranging or maintaining orthogonal transform coefficient zig-zag order, depending on rotation angle,
    altering signs of said orthogonal transform coefficients by an exclusive OR operation inverting binary values of said orthogonal transform coefficients, and
    storing an R value with an adjacent S value and orthogonal transform coefficient value in reverse zig-zag order if said zig-zag order is rearranged.

2. A method as recited in claim 1, wherein said method is performed using a packed block data structure including
    an R/S byte,
    an orthogonal transform coefficient adjacent said R/S byte, and
    an end of block indicator.

3. A method as recited in claim 1, wherein said method is performed using a packed data block structure including
    a first pair of bytes representing a block number, a Klast value and at least one flag indicating if all said coefficient values in said block are coded in eight bits or fewer or if any requires more than eight bits to be uniquely coded,
    a second pair of bytes respectively representing an R/S value and a coefficient value.

4. A method as recited in claim 3, wherein said packed block data structure further includes
    at least one additional pair of bytes including a EOB byte and a padding byte.

5. A method as recited in claim 3, wherein said first pair of bytes further includes
    another flag indicating if any runs of consecutive zero-valued coefficients greater than sixteen are present in said block.

6. A method as recited in claim 1, including further steps of
    testing for coefficient values requiring more than eight bits to be uniquely coded, and
    using a flag in at least one block of data to indicate if all said coefficient values in said block are coded in eight bits or fewer or if any requires more than eight bits to be uniquely coded.

7. A method as recited in claim 6 wherein said coefficient values are DCT coefficients.

8. A method as recited in claim 7 wherein said DCT coefficients are AC DCT coefficients.

9. A method as recited in claim 8, wherein said testing step is performed once per image.

10. A method as recited in claim 8, wherein said testing step is performed once per block.

11. A method as recited in claim 8 including the further step of using another flag in a block of data to indicate if any ZRLs are present.

* * * * *